(12) United States Patent
Lee et al.

(10) Patent No.: US 11,160,430 B2
(45) Date of Patent: Nov. 2, 2021

(54) VACUUM CLEANER

(71) Applicant: LG ELECTRONICS INC., Seoul (KR)

(72) Inventors: Changhoon Lee, Seoul (KR); Gunho Ha, Seoul (KR); Seonghoon Han, Seoul (KR)

(73) Assignee: LG ELECTRONICS INC., Seoul (KR)

(*) Notice: Subject to any disclaimer, the term of this patent is extended or adjusted under 35 U.S.C. 154(b) by 386 days.

(21) Appl. No.: 16/243,463

(22) Filed: Jan. 9, 2019

(65) Prior Publication Data
US 2019/0142235 A1 May 16, 2019

Related U.S. Application Data

(63) Continuation of application No. 15/223,578, filed on Jul. 29, 2016, now abandoned.

(30) Foreign Application Priority Data

Jul. 29, 2015 (KR) .................. 10-2015-0107479
Jul. 29, 2015 (KR) .................. 10-2015-0107480

(51) Int. Cl.
*A47L 9/28* (2006.01)
*H02J 7/00* (2006.01)
(Continued)

(52) U.S. Cl.
CPC ............. *A47L 9/2884* (2013.01); *A47L 5/362* (2013.01); *A47L 9/102* (2013.01); *A47L 9/1409* (2013.01);
(Continued)

(58) Field of Classification Search
CPC ........ A47L 5/362; A47L 9/102; A47L 9/1409; A47L 9/24; A47L 9/2842; A47L 9/2857;
(Continued)

(56) References Cited

U.S. PATENT DOCUMENTS 8,405,357 B2   3/2013  Saeki et al.
8,673,487 B2   3/2014  Churchill
(Continued)

FOREIGN PATENT DOCUMENTS

CN   102800903   11/2012
CN   104364935    2/2015
(Continued)

OTHER PUBLICATIONS

JP-2003219998-A—English Machine Translation (Year: 2003).*
(Continued)

*Primary Examiner* — Marc Carlson
(74) *Attorney, Agent, or Firm* — Ked & Associates LLP

(57) ABSTRACT

A vacuum may include a cleaner body including a suction motor for generating suction force, a suction part communicating with the cleaner body and suctioning air and dust, and a battery assembly for supplying a power to the suction motor. The battery assembly may include a battery unit, a battery terminal, a switch for connecting or disconnecting the battery unit and the battery terminal, and a battery case for accommodating the battery unit. The cleaner body may include a body supporting the battery assembly and a switching operation part for operating the switch when the battery assembly is mounted on the cleaner body.

20 Claims, 21 Drawing Sheets

(51) Int. Cl.
*H01M 10/46* (2006.01)
*H01M 2/34* (2006.01)
*A47L 5/36* (2006.01)
*A47L 9/14* (2006.01)
*A47L 9/24* (2006.01)
*A47L 9/10* (2006.01)
*H01M 50/572* (2021.01)

(52) U.S. Cl.
CPC ............... *A47L 9/24* (2013.01); *A47L 9/2842* (2013.01); *A47L 9/2857* (2013.01); *A47L 9/2873* (2013.01); *H01M 10/46* (2013.01); *H01M 50/572* (2021.01); *H02J 7/00* (2013.01); *H02J 7/0024* (2013.01); *H02J 7/0031* (2013.01); *H02J 7/0042* (2013.01)

(58) Field of Classification Search
CPC .... A47L 9/2873; A47L 9/2878; A47L 9/2884; H01M 10/46; H01M 50/572; H02J 7/00; H02J 7/0024; H02J 7/0031; H02J 7/0036; H02J 7/0042; Y02E 60/10
See application file for complete search history.

(56) References Cited

U.S. PATENT DOCUMENTS

| | | | | |
|---|---|---|---|---|
| 2008/0172821 | A1* | 7/2008 | Kang | A47L 5/24 15/327.5 |
| 2012/0293128 | A1* | 11/2012 | Kim | H02J 7/0016 320/117 |
| 2012/0299549 | A1* | 11/2012 | Kim | H02J 7/0024 320/118 |
| 2013/0207615 | A1* | 8/2013 | Sunderland | B25F 5/02 320/135 |
| 2014/0101887 | A1* | 4/2014 | Reed | A47L 5/24 15/339 |
| 2015/0155606 | A1* | 6/2015 | Stickney | H01M 50/213 429/90 |
| 2017/0000304 | A1* | 1/2017 | Ishizawa | A47L 9/2857 |

FOREIGN PATENT DOCUMENTS

| | | |
|---|---|---|
| JP | 1993-253096 | 10/1993 |
| JP | 2000-082448 | 3/2000 |
| JP | 2003-219997 | 8/2003 |
| JP | 2003-219998 | 8/2003 |
| JP | 2003219998 A * | 8/2003 |
| JP | 2012-079547 | 4/2012 |
| JP | 2015-123303 | 7/2015 |
| KR | 10-2006-0118796 | 11/2006 |
| KR | 10-2012-0128898 | 11/2012 |
| WO | WO 2008/155209 | 12/2008 |

OTHER PUBLICATIONS

Korean Office Action dated May 11, 2016 issued in Application No. 10-2015-0107480.

Korean Office Action dated Jun. 10, 2016 issued in Application No. 10-2015-0107479.

European Search Report dated Dec. 22, 2016 issued in Application No. 16181574.1.

Taiwanese Office Action (with English Translation) dated Mar. 20, 2017 issued in Application No. 105123755.

\* cited by examiner

VACUUM CLEANER

CROSS-REFERENCE TO RELATED APPLICATIONS

This application is a Continuation Application of prior U.S. patent application Ser. No. 15/223,578 filed Jul. 29, 2016, which claims priority under 35 U.S.C. § 119 to Korean Patent Application No. 10-2015-0107479, filed on Jul. 29, 2015, and Korean Patent Application No. 10-2015-0107480, filed on Jul. 29, 2015, whose entire disclosures are hereby incorporated by reference.

BACKGROUND

1. Field

The present disclosure relates to a vacuum cleaner.

2. Background

In general, vacuum cleaners are devices that suction air containing dusts by using a suction force generated by a suction motor mounted on a main body to filter the dusts in the main body. Vacuum cleaners are classified into manual cleaners and automatic cleaners. The manual cleaners are cleaners that are used for directly performing cleaning by a user, and the automatic cleaners that travel by oneself to perform cleaning. The manual cleaners may be classified into a canister type cleaner in which a suction nozzle is provided separately with respect to a main body and connected to the main body by using a connection tube and an upright type cleaner in which a suction nozzle is coupled to a main body.

A power cord outlet of a cleaner is disclosed in Korean Patent Publication No. 10-2006-0118796 (Published Date: Nov. 24, 2006). According to the prior document, since a cord reel assembly is provided in a main body, and a power cord is connected to a socket, the main body may receive a power. In the prior document, since a cleaner receives a power through the cord reel assembly, the cleaner may move by only a distance corresponding to a length of the cord wound around the cord reel assembly when the cleaner performs cleaning.

The above reference is incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

Figure 1:
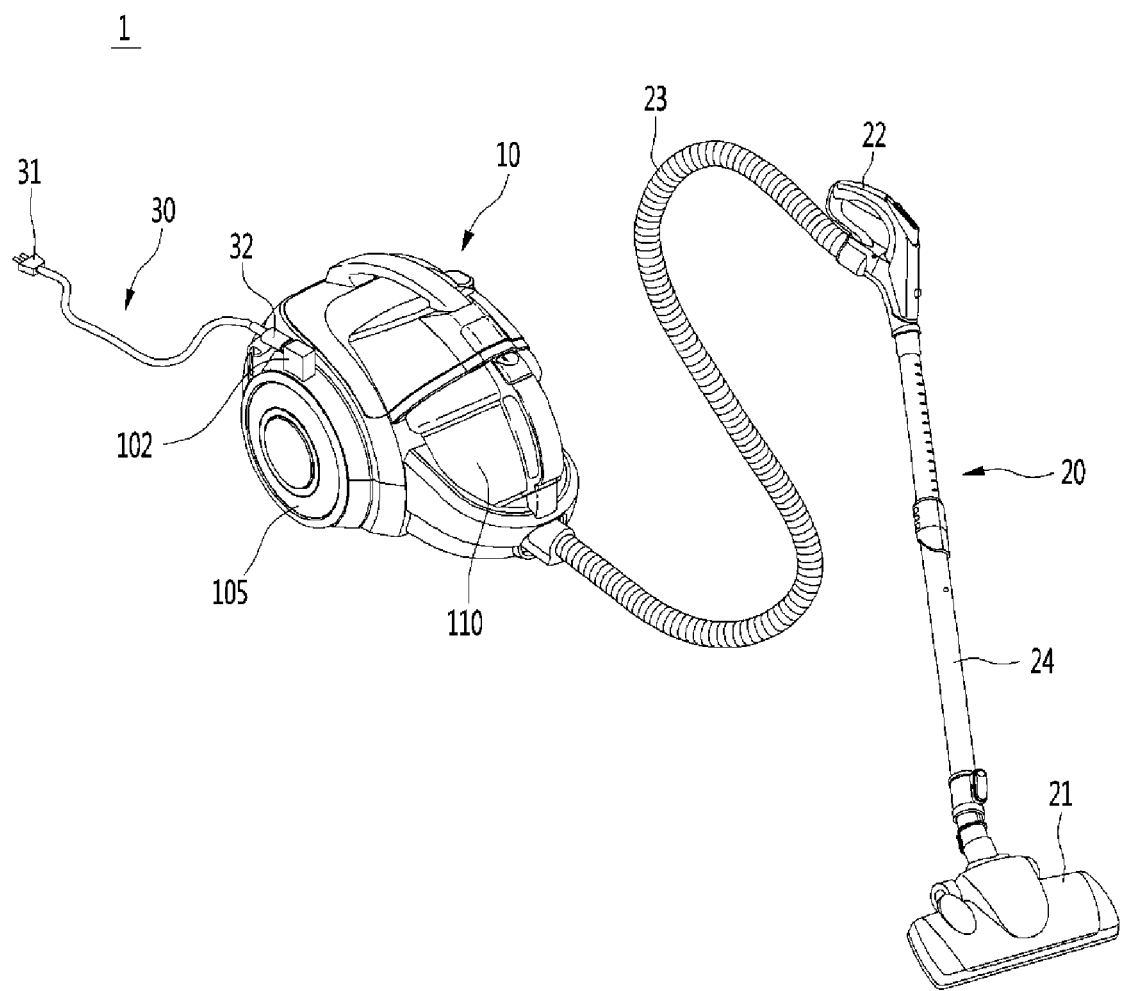
FIG. 1 is a perspective view of a vacuum cleaner according to a first embodiment.
Figure 2:
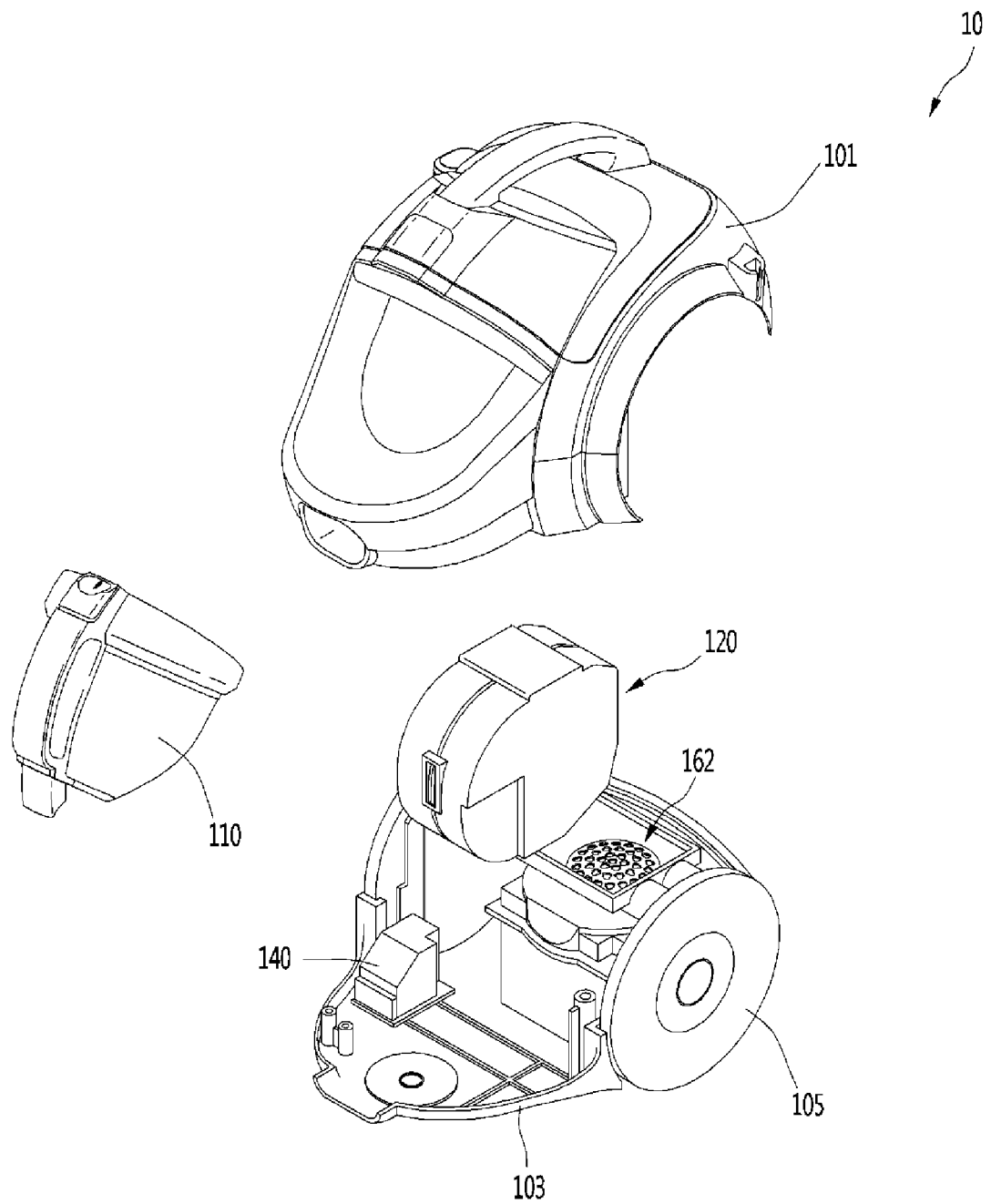
FIG. 2 is an exploded perspective view of a vacuum cleaner according to a first embodiment.
Figure 3:
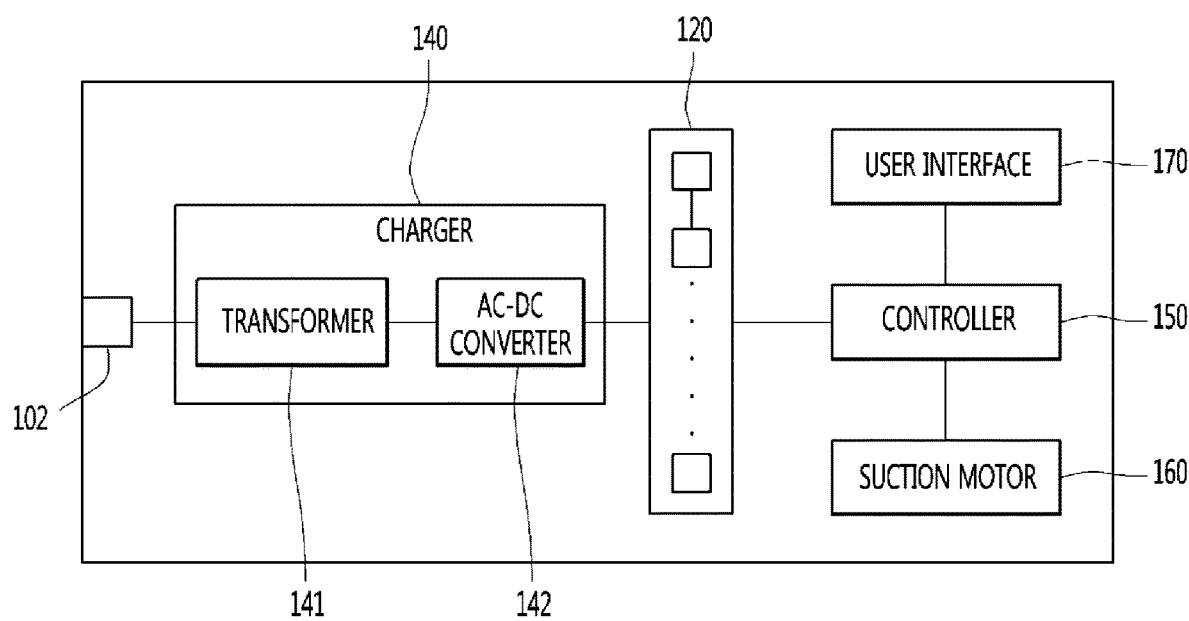
FIG. 3 is a block diagram showing the configuration of a vacuum cleaner according to a first embodiment.
Figure 4:
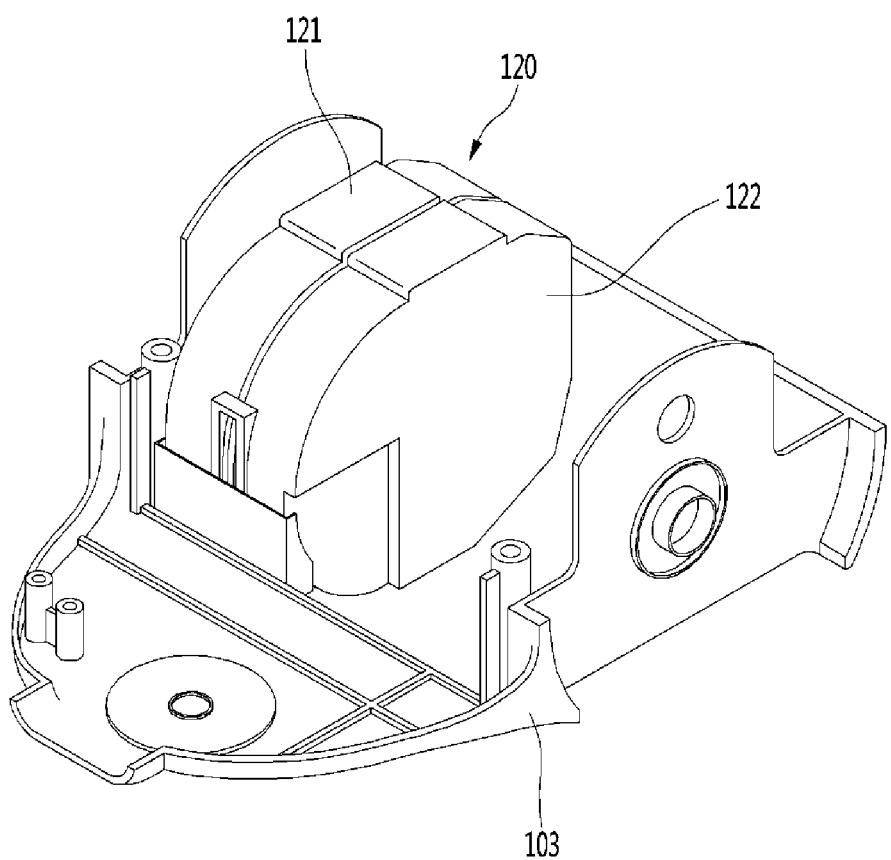
FIG. 4 is a diagram showing a state in which a battery assembly according to a first embodiment is mounted on a second body.
Figure 5:
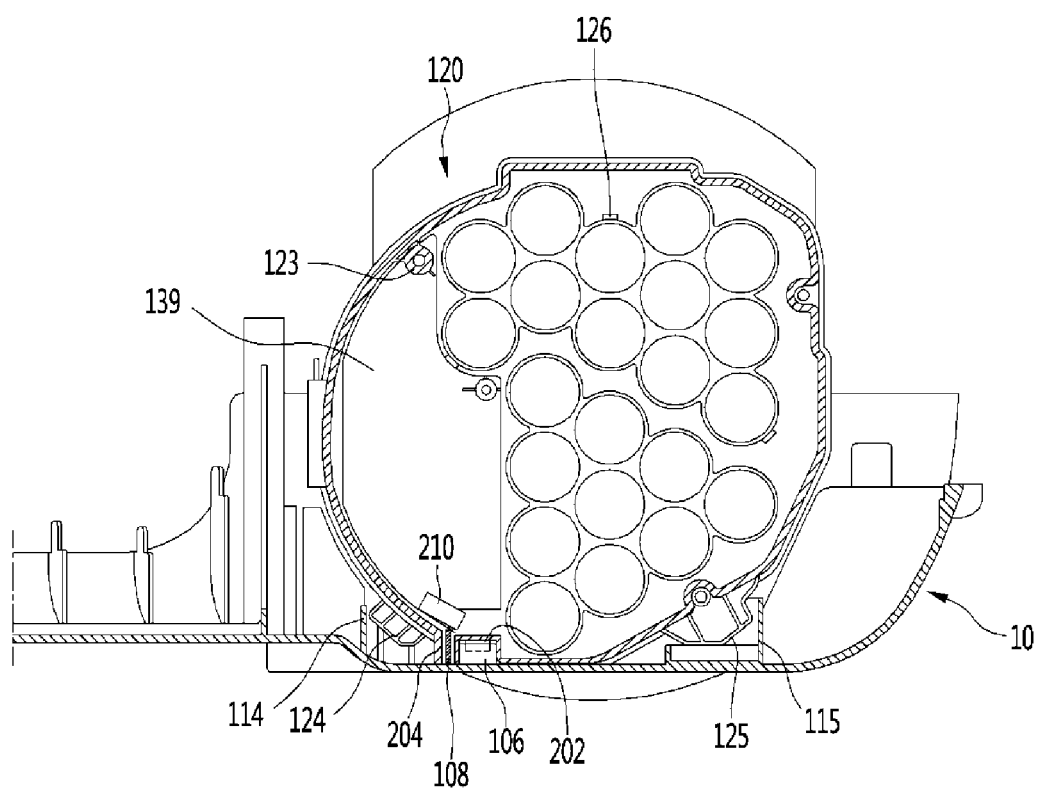
FIG. 5 is a vertical cross-sectional view of FIG. 4.
Figure 6:
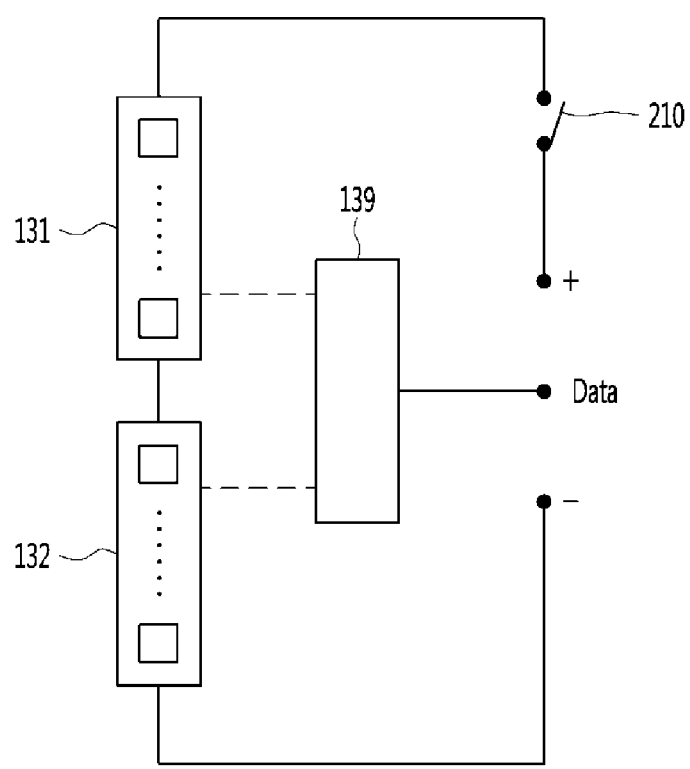
FIG. 6 is a circuit diagram of a battery assembly according to a first embodiment.

Referring to FIGS. 1 to 3, a vacuum cleaner 1 according to an embodiment may include a cleaner body 10 having a suction motor 160 for generating a suction force and a suction device 20 for guiding air containing dusts to the cleaner body 10. The suction device 20 may include a suction part 210 for suctioning dusts on a surface to be cleaned, e.g., a ground surface. Although the canister type cleaner is described as a cleaner, the present invention is applicable to an upright type cleaner.

The suction device 20 may further include connection parts 22, 23, and 24 for connecting the suction part 21 to the cleaner body 10. The connection parts 22, 23, and 24 may include an extension tube 24 connected to the suction part 21, a handle 22 connected to the extension tube 24, and a suction hose 23 connecting the handle 22 to the cleaner body 10.

Also, the vacuum cleaner 1 may further include a dust separation part (not shown) for separating the suctioned air and dusts from the suction device 20 from each other and a dust container 110 for storing the dusts separated by the dust separation part. The dust container 110 may be separably mounted on the cleaner body 10. The dust separation part and the dust container 110 may be manufactured as separated items, or the dust separation part and the dust container 110 may be provided as one module.

The vacuum cleaner 1 may include a controller 150 to control an operation of the suction motor 160, a battery assembly 120 supplying power for operating the suction motor 160, a charger 140 for charging the battery assembly 120, and a power cord 30 separably connected to the cleaner body 10 to supply commercial power to the cleaner body 120. The power cord 30 may include a plug 31 connected to a socket and a cord connector 32 connected to the cleaner body 10. Also, the cleaner body 10 may include a main body connector 102 to which the cord connector 32 is connected.

The cleaner body 10 may include a first body 101 and a second body 103 coupled to a lower portion of the first body 101. Wheels 105 may be coupled to both sides of the second body 103, respectively.

The suction motor 160, the battery assembly 120, and the charger 140 may be disposed on the second body 103. The suction motor 160 may be protected by a motor housing 162. That is, the suction motor 160 may be accommodated into the motor housing 162.

Here, for space efficiency, the battery assembly 120 may be disposed at a side of the motor housing 162, i.e., at a side of the suction motor 160. The suction motor 160 and the battery assembly 120 may be disposed between the plurality of wheels 105. Also, the battery assembly 120 may be disposed between one of the plurality of wheels 105 and the suction motor 160. Also, the charger 140 may be disposed spaced apart from the battery assembly 120.

The dust container 110 may be separably coupled to the first body 101. Also, the main body connector 102 may be disposed on the first body 101.

The battery assembly 120 may include one or more battery units 131 and 132. The one or more battery units 131 and 132 include a plurality of battery cell. That is, in the present disclosure, a group of the plurality of battery cells may be called a battery unit.

The plurality of battery cells may be a secondary battery that is chargeable or dischargeable. The maximum DC voltage (the sum of voltages of the plurality of battery cells) charged in the one or more battery units 131 and 132 may exceed about 42.4 V. For example, the battery units 131 and 132 may have the maximum charging voltage of above about 84.8 V.

The charger 140 may perform rectification and smoothing operations to receive a commercial AC voltage, thereby converting the received AC voltage into a DC voltage. Also, the charger 140 may supply the converted DC voltage to the battery units 131 and 132. For example, the charger 140 may convert the commercial AC voltage of about 220V into a DC voltage of above about 42.4 V to supply the converted DC voltage to the battery units 131 and 132.

The charger 140 may include a transformer 141 for transforming the inputted AC voltage and an AC-DC converter 142 for converting the AC voltage outputted from the transformer 141 into a DC voltage. Here, the DC voltage outputted from the AC-DC converter 142 may exceed about 42.4 V.

For another example, the transformer 141 may transform the DC voltage outputted from the AC-DC converter. In this case, the DC voltage outputted form the transformer 141 may exceed about 42.4 V.

For further another example, the charger 140 does not have the transformer 141, and the AC-DC converter 142 may include a circuit for preventing the DC voltage from being converted into the AC voltage. That is, the AC-DC converter 142 may be an insulation type converter. In the current embodiment, the AC-DC converter 142 may be a well-known converter, and thus detailed description of the AC-DC converter 142 will be omitted.

In the current embodiment, for example, the suction motor 160 may be a brushless direct current (BLDC) motor. Also, the suction motor 160 may have a maximum output, e.g., 600 W or more.

When the voltage charged in the battery units 131 and 132 is below about 42.4 V, a circuit that is required to drive the suction motor 160 has a complicated structure because current has to be at least above about 14.15 A to operate a high-power suction motor 160. However, according to the current embodiment, since the maximum voltage charged in the battery units 131 and 132 is above about 84.8 V, the current required to operate the suction motor 160 may be less than about 7.1 A. Thus, the circuit that is required to drive the suction motor 160 may be simplified in structure.

According to the current embodiment, since the DC voltage of above about 42.4 V is outputted form the charger 140, and the battery units 131 and 132 have the maximum charging voltage of above about 84.8 V, the suction motor 160 may output high power. Thus, the vacuum cleaner 1 may increase in suction force to improve cleaning performance.

Also, the power cord 30 may be connected to the vacuum cleaner 1 when the battery units 131 and 132 are charged. When cleaning is performed by using the vacuum cleaner 1, the power cord 30 may be separated from the vacuum cleaner 1 and be used. Thus, the vacuum cleaner 1 may be improved in degree of mobility.

That is, since the vacuum cleaner 1 receives the power from the battery units 131 and 132 without having a cord reel, the vacuum cleaner 1 is not limited in movement distance. Also, the vacuum cleaner does not have to jump over the cord wound around the cord reel or move while clearing up the cord while the vacuum cleaner 1 moves, and thus the vacuum cleaner 1 may smoothly move.

Also, in the current embodiment, the battery units 131 and 132 are electrically connected to the main body connector 102, and the battery units 131 and 132 have the maximum charging voltage of above about 84.8 V. Thus, if there is no transformer 141, the user may be in danger when the user contacts the main body connector 102. However, in the current embodiment, since the charger 140 includes the transformer 141, the transformer 141 may perform an insulation function to improve user's safety.

The vacuum cleaner 1 may further include a user interface 170. The user interface 170 may receive an operation command of the vacuum cleaner 1 and display operation information or state information of the vacuum cleaner 1.

The user interface 170 may be disposed on at least one of the handle 22 or the cleaner body 10. The user interface 170 may be provided in a structure in which an input unit and a display unit are integrally disposed or include an input unit and a display unit that are separately provided. Power-on selection, a cleaning mode, intensities of a suction force of the vacuum cleaner 1 may be selected through the input unit. The display unit may display residual amount information of at least the battery units 131 and 132. When the battery residual amount of the battery units 131 and 132 reaches a reference value, the controller 150 may allow the display unit to display information for notifying that the battery units 131 and 132 has to be charged.

For another example, the display unit may continuously or gradually display the battery residual amount of the battery units 131 and 132. For example, the display unit may display the battery residual amount of the battery units 131 and 132 by a number, a symbol, or a graph. Or, the display unit may include a plurality of light emitting parts to display the battery residual amount of the battery units 131 and 132 by turning on the plurality of light emitting parts in different numbers. Or, the display unit may change a color of light irradiated from the light emitting part to display the battery residual amount of the battery units 131 and 132.

Referring to FIGS. 4 to 7, the battery assembly 120 may further include battery cases 121 and 122 for accommodating the one or more battery units 131 and 132. The battery cases 121 and 122 may include a first battery case 121 and a second battery case 122 coupled to the first battery case 121.

The battery cases 121 and 122 may be seated on the second body 103. Each of the battery cases 121 and 122 may have an approximately cylindrical shape. Since each of the battery cases 121 and 122 has an approximately cylindrical shape, a space in which the battery cases 121 and 122 take up in the cleaner body 10 may be minimized. At least one of the first or second battery cases 121 and 122 may include at least one coupling boss 123 to which a coupling member is coupled.

A plurality of cover guides 124 and 125 that are spaced apart from each other in a forward-backward direction of the cleaner body 10 may be disposed on each of the battery covers 121 and 122. Also, a plurality of body guides 114 and 115 contacting the plurality of cover guides 124 and 125 may be disposed on the second body 103.

The plurality of cover guides 124 may be protruded from the battery cases 121 and 122. In a state where the plurality of cover guides 124 and 125 contact the plurality of body guides 114 and 115, movement of the battery cases 121 and 122 in the forward-backward direction of the cleaner body 10 may be minimized. That is, the plurality of cover guides 124 and 124 may include a first cover guide 124 and a second cover guide 125 disposed at a rear side of the first cover guide 124.

The plurality of body guides 114 and 115 may include a first body guide 114 that is in contact with a front surface of the first cover guide 124 and a second body guide 115 that is in contact with a back surface of the second guide 125. That is, the first and second cover guides 124 and 125 may be disposed between the first body guide 114 and the second body guide 115.

For another example, the first cover guide 124 may be accommodated into the first body guide 114, and the second cover guide 125 may be accommodated into the second body guide 115. Or, the cover guides 124 and 125 may be one or more grooves, and the body guides 114 and 115 may be inserted into the one or more cover guides 124 and 125.

The battery cases 121 and 122 may include a plurality of support ribs 126 for supporting a battery supporter that will be described later. The plurality of support ribs 126 may prevent the battery supporter from moving in the battery cases 121 and 122 without a separate fixing unit. Of course, the battery supporter may be coupled to the battery cases 121 and 122 by the coupling member.

The battery assembly 120 may further include a battery management unit 139. The battery management unit 139 may manage each battery cell to be maintained at a constant voltage. That is, the battery management unit 139 enables the battery assembly 120 to output a constant voltage.

The battery assembly 120 may include a battery terminal 202 and the cleaner body 10 may include a body terminal 106 connected to the battery terminal 202. The battery terminal 202 may include an input/output terminal of charging/discharging current and a communication terminal for data communication.

The body terminal 106 may be connected to the charger 140 or the controller 160. Although not limited thereto, the body terminal 106 may be provided in the second body 103.

When the battery assembly 120 is seated on the second body 103, the battery terminal 202 may be connected to the body terminal 106. Alternatively, in a state in which the battery assembly 120 is seated on the second body 103, a user may connect the battery terminal 202 to the body terminal 106. In this case, the body terminal 106 may be fixed to the second body 103 or may not be fixed to the second body 103 in a state of being connected to a flexible wire.

The battery assembly 120 may further include a switch 210 for connecting or disconnecting one end of the battery units 131 and 132 and the battery terminal 202. The switch 210 may be a micro switch which may be turned on by external force. The switch 210 may be mounted on the battery cases 121 and 122 or the battery management unit 139. Although the switch 210 is disposed between one end of the battery units 131 and 132 and a positive pole (+) in FIG. 6, the switch 210 may be disposed between one end of the battery units 131 and 132 and a negative pole (−).

The cleaner body 10 may further include a switching operation part 108 for operating the switch 210 to turn the switch 210 on in a process of mounting the battery assembly 120 in the cleaner body 10. Although not limited thereto, the switching operation part 108 may be a protrusion protruding from the second body 103.

The battery cases 121 and 122 may include an accommodation part 204 for accommodating the switch operation part 108. When a user moves the battery assembly 120 from the upper side to lower side of the second body 103 to position the plurality of cover guides 124 and 125 between the plurality of body guides 114 and 115, the switching operation part 108 is inserted into the accommodation part 204 and the switching operation part 108 operates the switch 210 to turn the switch 210 on.

When the switch 210 is turned on, the battery units 131 and 132 and the battery terminal 202 may be electrically connected. When the battery units 131 and the battery terminal 202 are connected, charging or discharging becomes possible.

Figure 7:
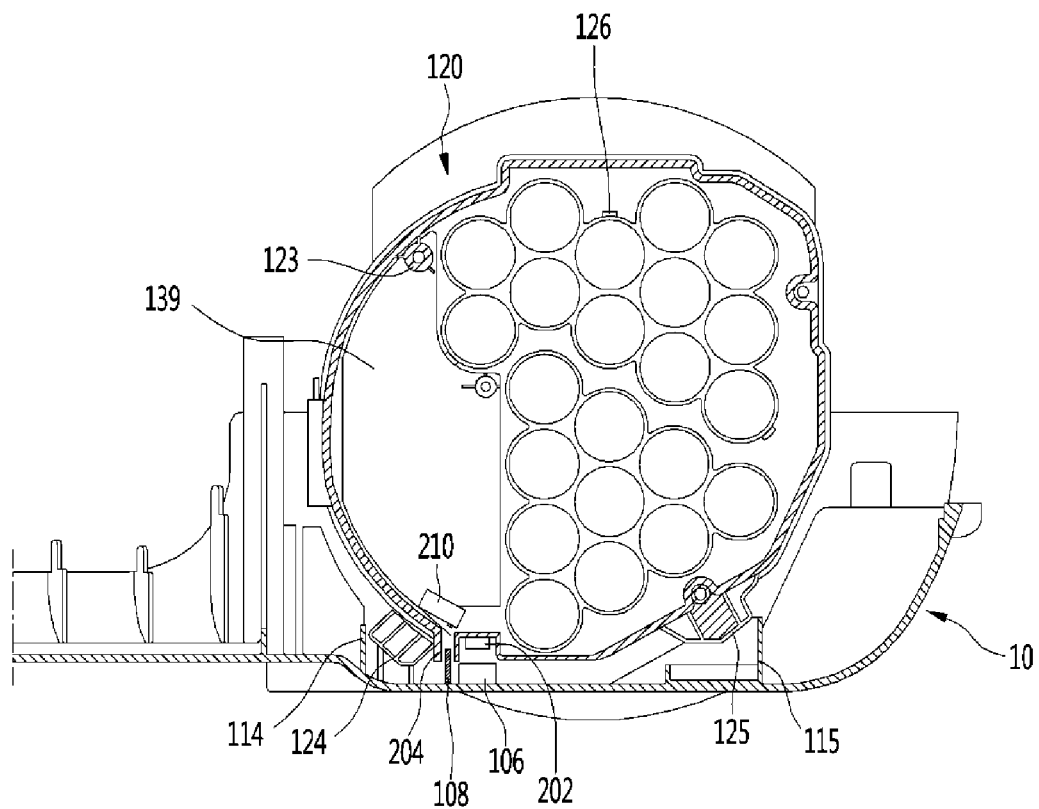
FIG. 7 is a diagram showing a state in which a battery terminal of a battery assembly according to a first embodiment is separated from a body terminal.

In contrast, as shown in FIG. 7, when the battery terminal 202 and the body terminal 106 are separated (when the battery assembly is separated from the cleaner body), the switching operation part 108 withdrawn from the accommodation part 204 and external force for operating the switch 210 is removed to turn the switch 210 off. When the switch 210 is turned off, the battery units 131 and 132 and the battery terminal 202 are disconnected, such that charging and discharging become impossible.

According to the present embodiment, since the switch for connecting the battery terminal to the battery unit is turned off in a state in which the battery assembly is separated from the cleaner body, the output current of the battery becomes 0 and thus stability is secured even when the maximum charging voltage of the battery assembly is high. In addition, since the switching operation part 108 is accommodated in the accommodation part to operate the switch, it is possible to prevent the switch from unintentionally operating in a state in which the battery assembly is separated from the cleaner body.

Figure 8:
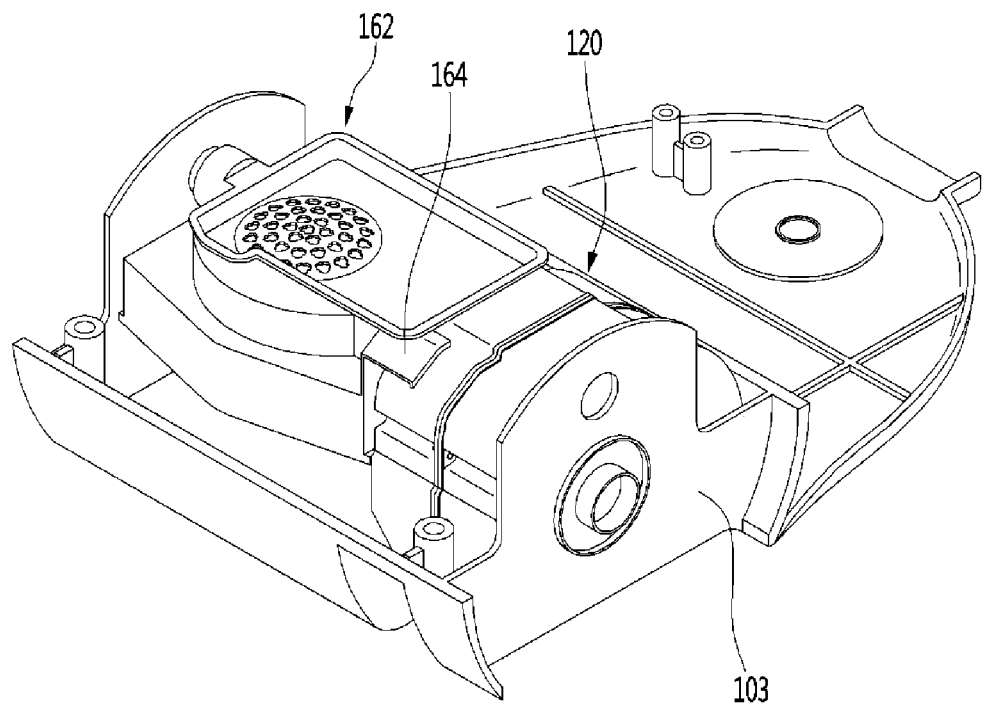
FIG. 8 is a diagram showing a positional relationship between a motor housing and a battery assembly according to a first embodiment.

FIG. 8 is a view illustrating an arrangement relationship between the motor housing and the battery assembly according to a first embodiment. Referring to FIG. 8, the motor housing 162 may include a contact rib 164 that contacts an upper portion of the battery assembly 120.

In a state where the battery assembly 120 is placed on the second body 103, the motor housing 162 may be coupled to the second body 103. Also, when the motor housing 162 is coupled to the second body 103, the contact rib 164 contacts the upper portion of the battery assembly 120. The contact rib 164 may press the battery assembly 120 downward in the state where the contact rib 164 is in contact with the upper portion of the battery assembly 120.

Since the contact rib 164 contacts the upper portion of the battery assembly 120, vertical movement of the battery assembly 120 may be prevented. According to an embodiment, since the movement of the battery assembly 120 is prevented by the contact rib 164 of the motor housing 162 and the cover guide 124 and 125 and the body guide 114 and 115 of the battery cases 121 and 122, a separate fixing unit for fixing the battery assembly 120 to the second body 103 is unnecessary.

Figure 9:
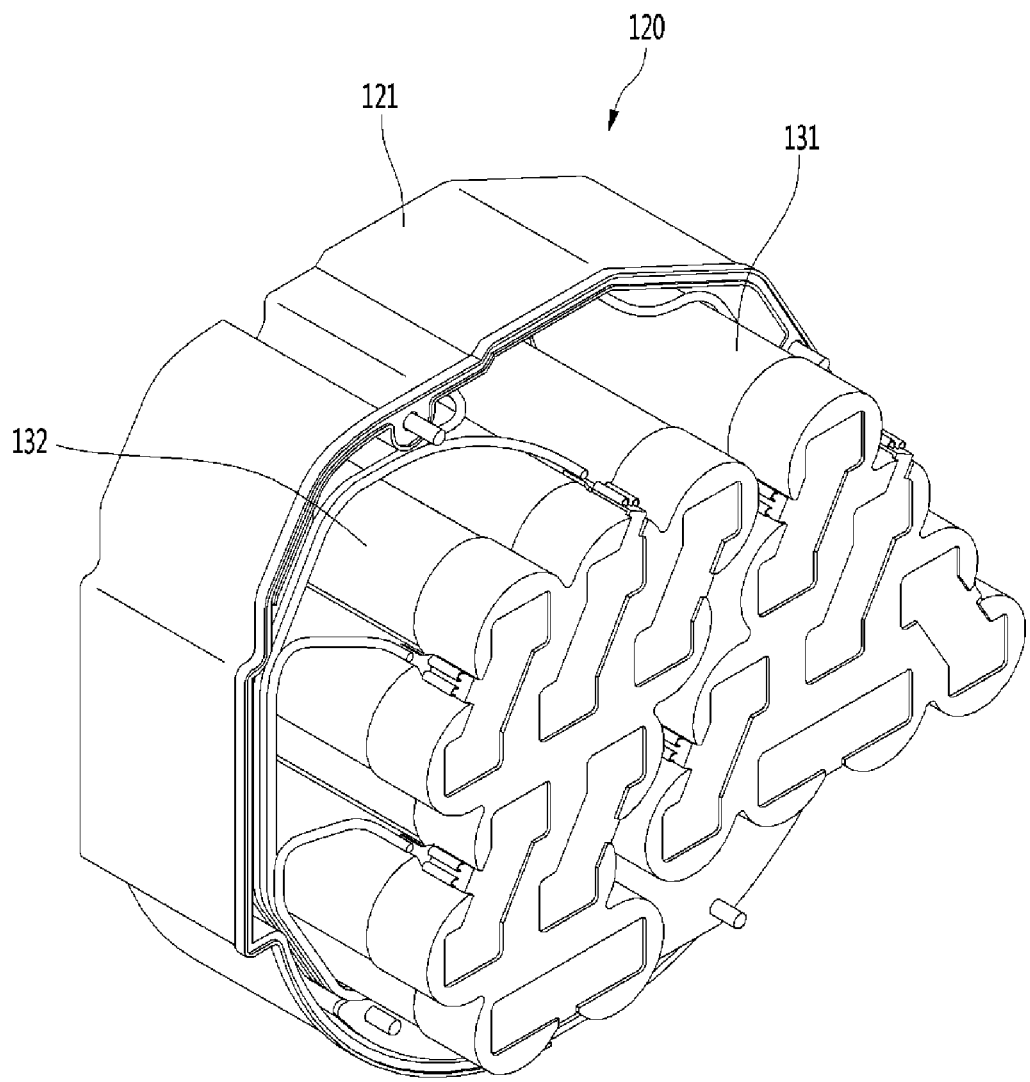
FIG. 9 is a perspective view showing a battery assembly according to a first embodiment.
Figure 10:
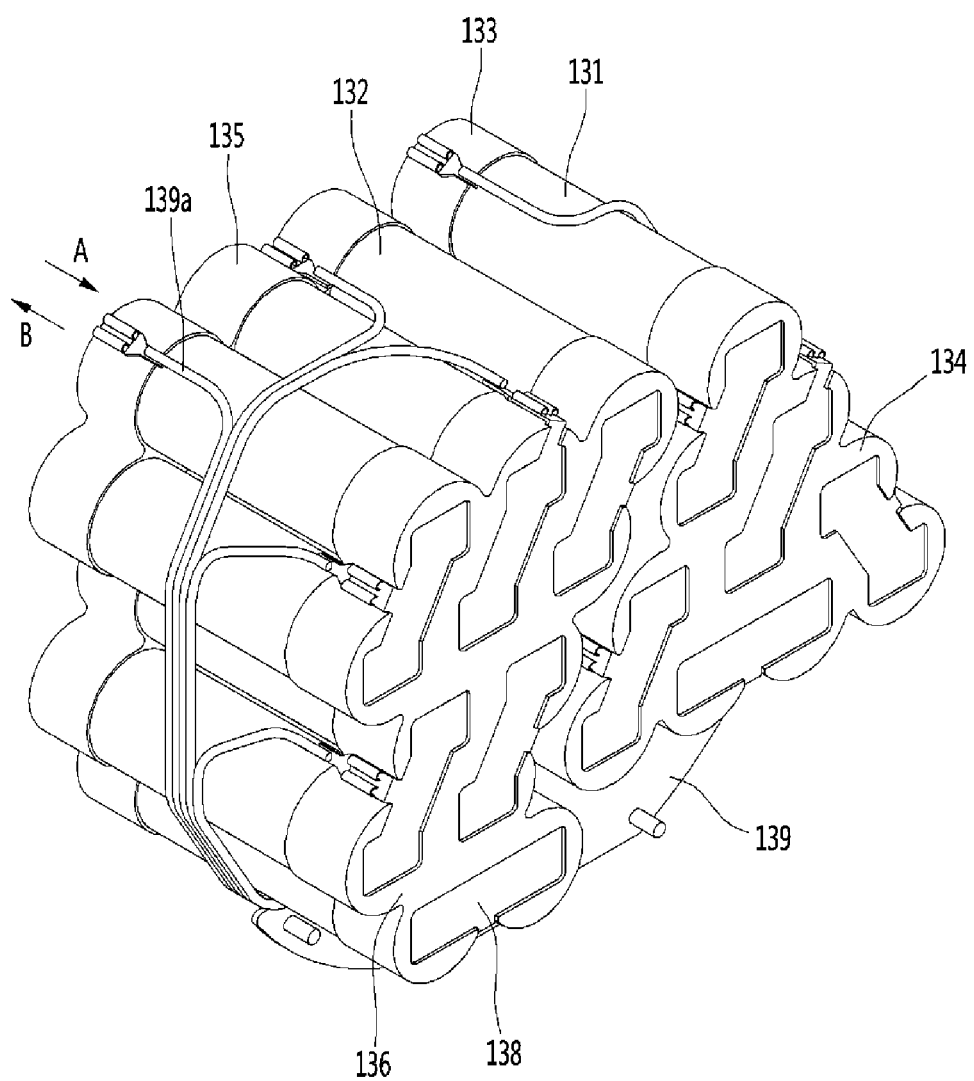
FIG. 10 is a perspective view showing an assembly of a battery unit and a battery supporter.

FIG. 9 is a perspective view of the battery assembly according to a first embodiment, and FIG. 10 is a perspective view illustrating an assembly of a battery unit and a battery support. For convenience of comprehension, a state in which the second battery case is removed is illustrated in FIG. 9. Referring to FIGS. 9 and 10, the battery assembly 120 may include one or more battery units 131 and 132 and a plurality of support devices for supporting the one or more battery units 131 and 132.

The one or more battery units 131 and 132 may include a first battery unit 131 and a second battery unit 132. The first battery unit 131 and the second battery unit 132 may be connected to each other in series. The plurality of battery support devices may include a first support device for supporting the first battery unit 131 and a second support device for supporting the second battery unit 132. Each of the support devices may support the plurality of cells constituting each of the battery units 131 and 132 at the same time.

The first support device may include a first support 133 supporting one side of the plurality of cells of the first battery unit 131 and a second support 134 supporting the other side of the plurality of cells of the first battery unit 131. The first and second supports 133 and 134 may support the first battery unit 131 in a state where the first and second supports 133 and 134 are spaced apart from each other. Thus, heat generated when the first battery unit 131 is discharged may be emitted between the first and second supports 133 and 134.

The second support device may include a third support 135 supporting one side of the plurality of cells of the second battery unit 132 and a fourth support 136 supporting the other side of the plurality of cells of the second battery unit 132. The third and fourth supports 135 and 136 may support the second battery unit 132 in a state where the third and fourth supports 135 and 136 are spaced apart from each other. Thus, heat generated when the second battery unit 132 is discharged may be emitted between the third and fourth supports 135 and 136.

Although the first and second supports 133 and 134 support ten cells of the first battery unit 131 at the same time, and the third and fourth supports 135 and 136 support twelve cells of the second battery unit 132 at the same time in FIG. 10, the present disclosure is not limited thereto. For example, the number of battery cells supported by each of the supports is not limited.

The plurality of battery cells of each of the battery units 131 and 132 may be disposed in a zigzag shape in the state where the cells are supported by the supports 133, 134, 135, and 136. That is, at least a portion of the other battery cell may be disposed on an area corresponding to an area between two battery cells. Since the plurality of battery cells are disposed in the zigzag shape in the current embodiment, a space that is occupied by the plurality of cells may be minimized.

A plurality of conductors 1389 for connecting a positive pole (+) of one battery cell to a negative pole (−) of the other battery cell in two battery cells adjacent to each other may be coupled to each of the supports 133, 134, 135, and 136. For example, the plurality of conductors 138 may be welded to each of the battery cells. However, the present disclosure is not limited to the coupling method between the plurality of conductors 138 and each of the battery cells.

Each of the plurality of conductors 138 is connected to the battery management unit 139 by an electric wire 139a. The battery management unit 139 may be mounted on the battery cases 121 and 122.

Figure 11:
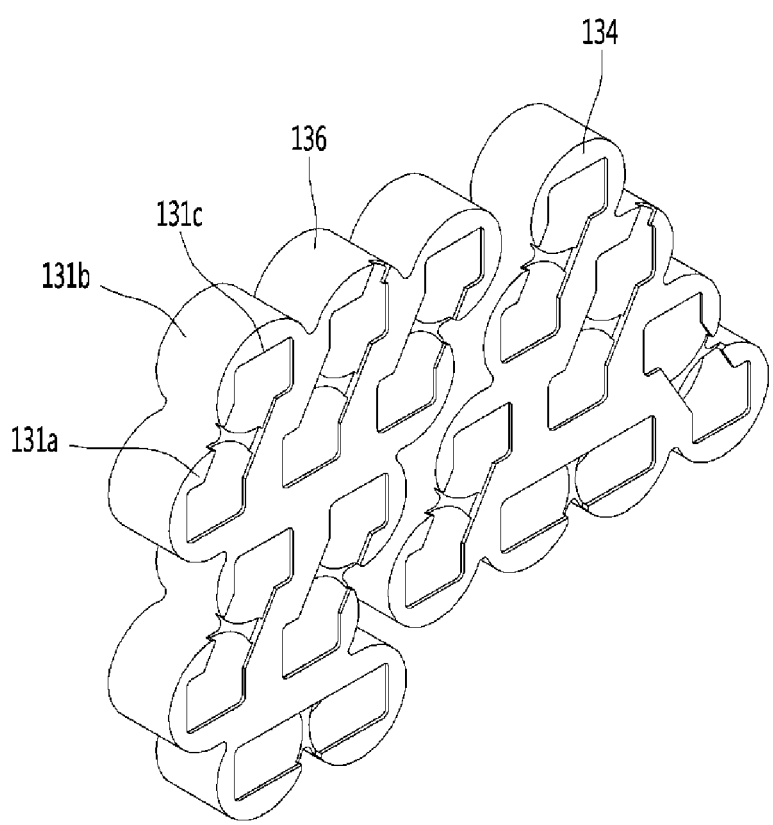
FIG. 11 is a perspective view showing a battery supporter according to a first embodiment.

FIG. 11 illustrates, for example, the second support and the fourth support. Also, the first support has a shape corresponding to that of the second support, and the third support has a shape corresponding to that of the fourth support. However, a hole in which the conductor is disposed may have a different shape.

Figure 12:
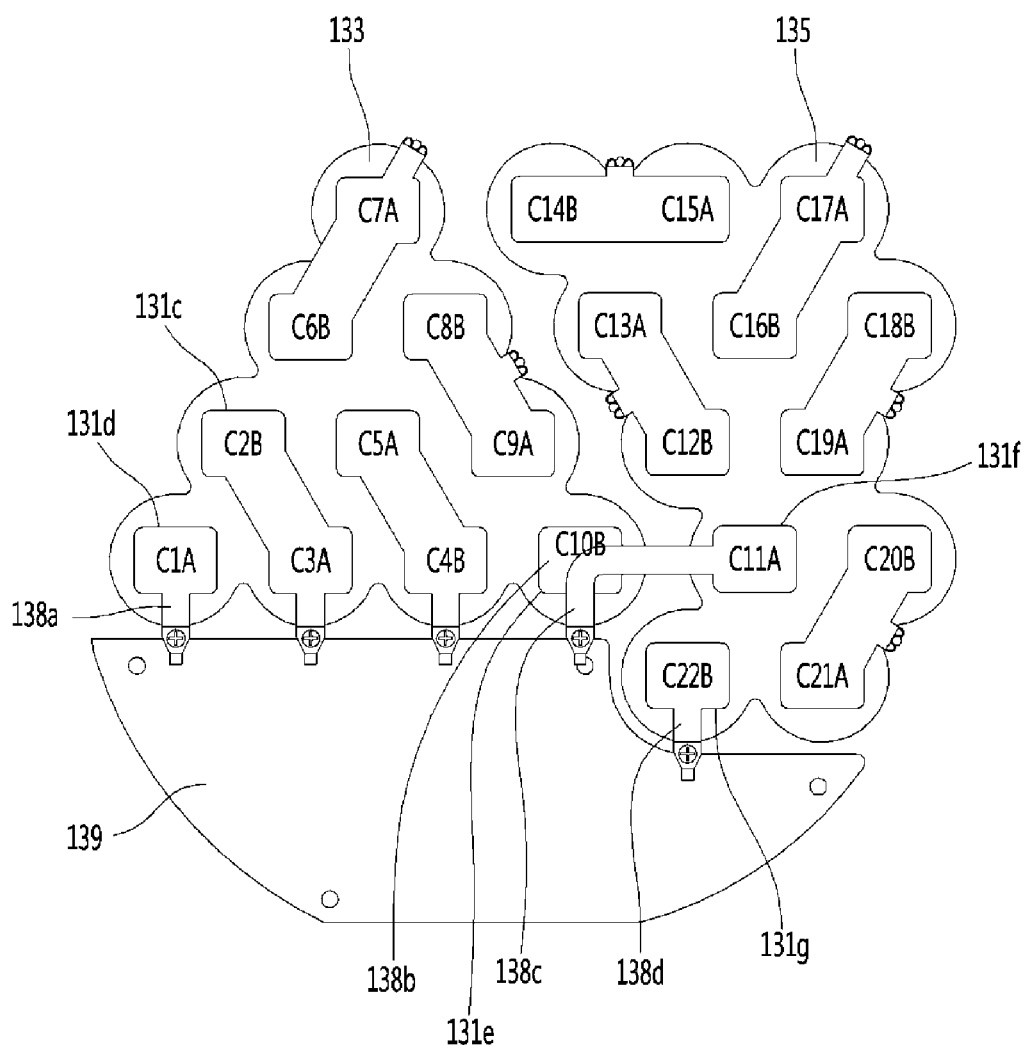
FIG. 12 is a diagram showing the assembly of the battery unit and the battery supporter of FIG. 10 when viewed in a direction A.
Figure 13:
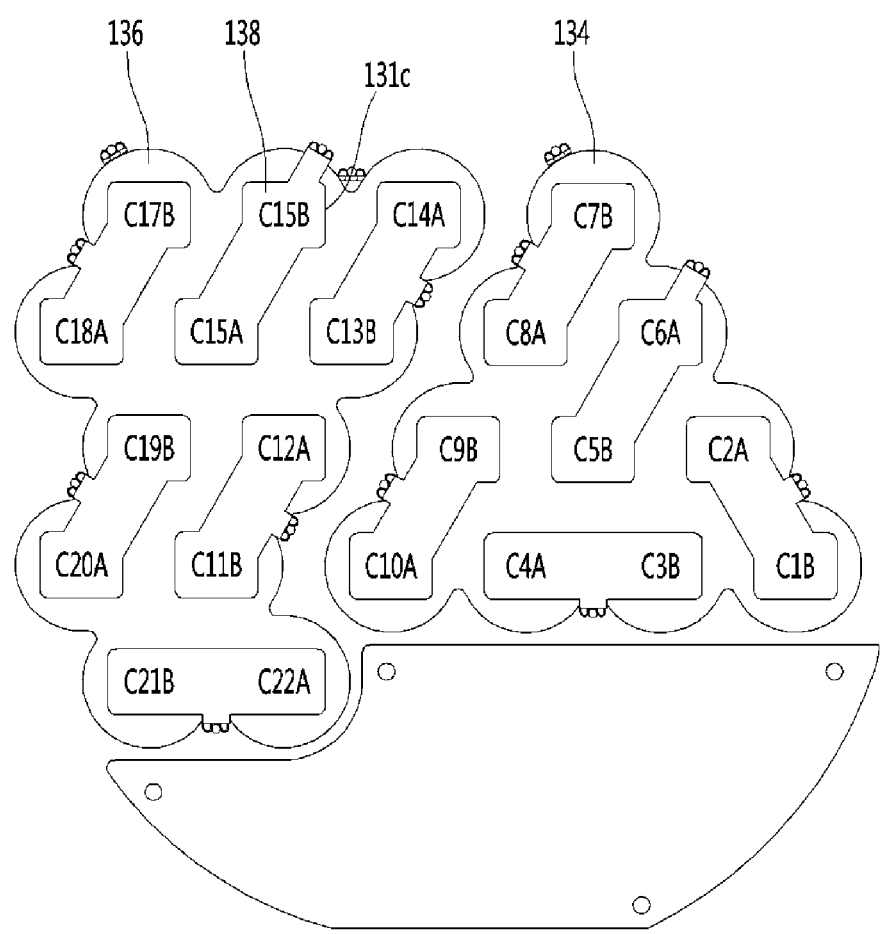
FIG. 13 is a diagram showing the assembly of the battery unit and the battery supporter of FIG. 10 when viewed in a direction B.

Referring to FIGS. 11 to 13, each of the supports 133, 134, 135, and 136 may include a support body 131a covering a side surface of each of the battery cells and a plurality of cell cover 131b extending from the support body 131a and provided in the same number as the battery cells. The plurality of cell covers 131b surround a portion of each of the battery cells. The plurality of cells are spaced apart from each other by the plurality of cell covers 131b in the state where the plurality of cells are supported by each of the supports 133, 134, 135, and 136. Thus, since the plurality of battery cells are supported by each of the supports 133, 134, 135, and 136 in the state where the battery cells are spaced apart from each other, heat generated from the plurality of battery cells may be effectively emitted into spaces between the plurality of battery cells.

The plurality of battery cells may be spaced apart from each other in a direction that is perpendicular to a longitudinal direction of the battery cell. In this specification, the longitudinal direction of the battery cell may be a direction in which the positive pole (+) and the negative pole (−) are connected to each other. That is, the plurality of battery cells may be disposed parallel to each of the supports 133, 134, 135, and 136 and connected to each other in series. Thus, according to the current embodiment, the battery assembly 120 may be compact because the plurality of battery cells are disposed in parallel.

The battery assembly 120 may be disposed so that a longitudinal direction of each of the battery cells is parallel to an extension direction of a shaft of one wheel between the one wheel of the plurality of wheels and the suction motor. Two battery cells, which are adjacent to each other, of the plurality of battery cells may be disposed so that a direction of a first pole of one cell is opposite to that of a first pole of the other battery cell.

A hole 131c in which the conductor 128 is disposed may be defined in the support body 131a of each of the supports 133, 134, 135, and 136. Two holes 131d and 131e in addition to the number of hole 131c corresponding to ½ of the number of battery cells installed on the first support 133 may be defined in the first support 133.

If the number of battery cells installed on the third support 133 is defined as m, two holes 131f and 131g in addition to (1/2*m)−1 holes 131c may be defined in the third support 135. For example, if ten battery cells are supported by the first support 133, seven holes 131c, 131d, and 131e may be defined in the first support 133. Also, if twelve battery cells are supported by the third support 135, seven holes 131c, 131f, and 131g may be defined in the third support 135.

Here, the conductor 138e disposed in one hole 131d of the two holes 131d and 131e defined in the first support 133 may be connected to only one pole of the battery cell. Also, the conductor 138b disposed in the other hole 131e of the two holes 131d and 131e defined in the first support 133 may contact the conductor 138c disposed in one hole 131f of the two holes 131f and 131g of the third support 135. Also, the conductor 138d disposed in the other hole 131g of the two holes 131f and 131g defined in the third support 135 may be connected to only one pole of the battery cell.

In FIGS. 12 and 13, the first pole of each battery cell is expressed as a reference symbol CnA, and the second pole is expressed as a reference symbol CnB. Where, n is natural number. Also, CnB is connected to C(n+1)A by the conductor 138. For example, the second pole C1B of the first battery cell is connected to the first pole C2A of the second battery cell by the conductor 138. However, each of the first pole C1A of the first battery cell and the second pole C22B of the last battery cell of the plurality of battery cells may be connected to one of the conductors 138a and 138d. Thus, according to the current embodiment, since the poles different from each other of the two battery cells are connected to the conductor, and each of the conductors is connected to the BMS, the voltage of each of the plurality of battery cells may be managed.

Although the battery case covers the battery unit in the foregoing embodiment, the preset disclosure is not limited thereto. For example, the battery case may be omitted. In this case, the contact rib of the motor housing may contact the upper portion of the battery support. Also, the cover guide that is described in FIG. 5 may be disposed on the battery support.

For another example, the battery support may be integrated with the battery case. In this case, the conductor is coupled to the battery support, and then the plurality of battery cells are inserted into the battery support to allow the conductor to contact the poles of the battery cells. However, a protrusion contacting the pole of the battery cell may be disposed on the conductor so that the conductor effectively contacts the battery cell.

In some cases, the battery assembly may include a switch and the switch may be turned on in a process of mounting the battery assembly. Although the switch is a micro switch which is turned on by mechanical operation in the above embodiment, the switch may be an electronically controlled switch. In this case, the battery management unit may sense whether the body terminal and the battery terminal are connected, turn the switch off when the battery terminal is separated from the body terminal, and turn the switch on when the battery terminal is connected to the body terminal.

As another example, the switch operation part is removed and the housing of the body terminal serves as the switch operation part. In this case, a portion of the switch may be exposed to an area in which the battery terminal is located or a portion of the body terminal may be inserted into the battery assembly to operate the switch.

Figure 14:
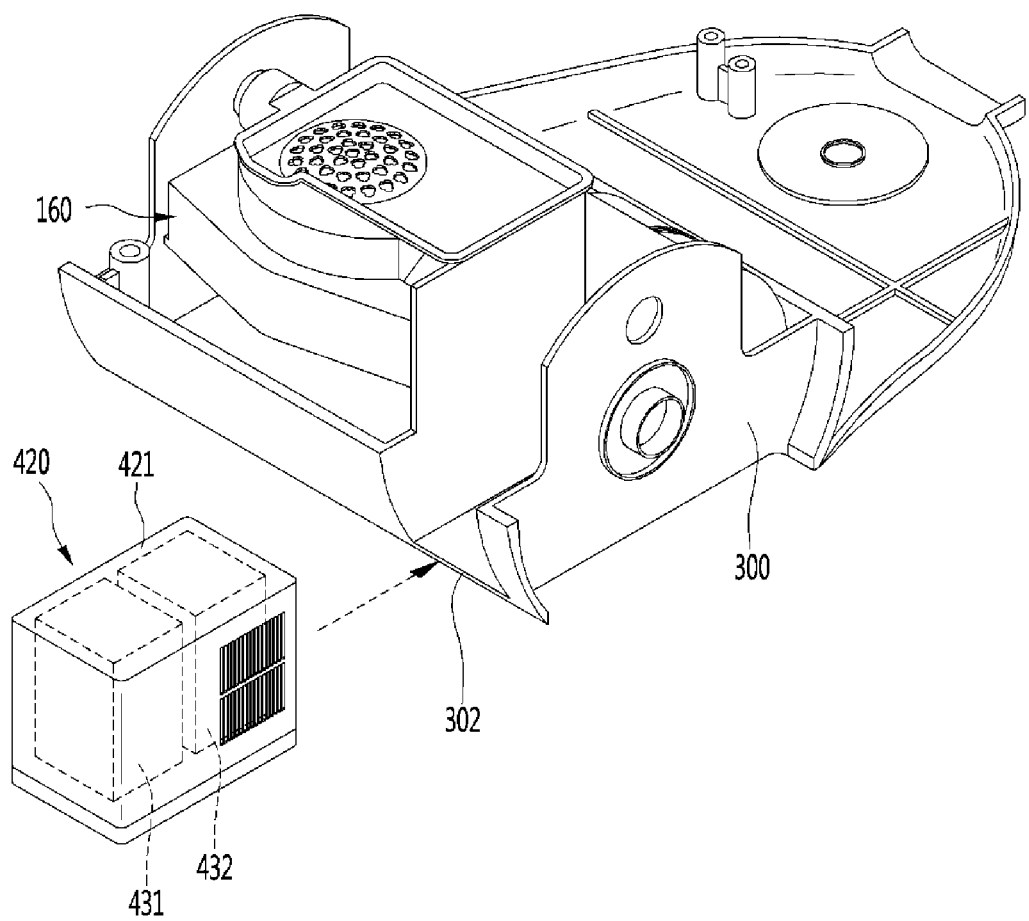
FIG. 14 is a diagram showing a state in which a battery assembly is separated from a vacuum cleaner according to another embodiment.
Figure 15:
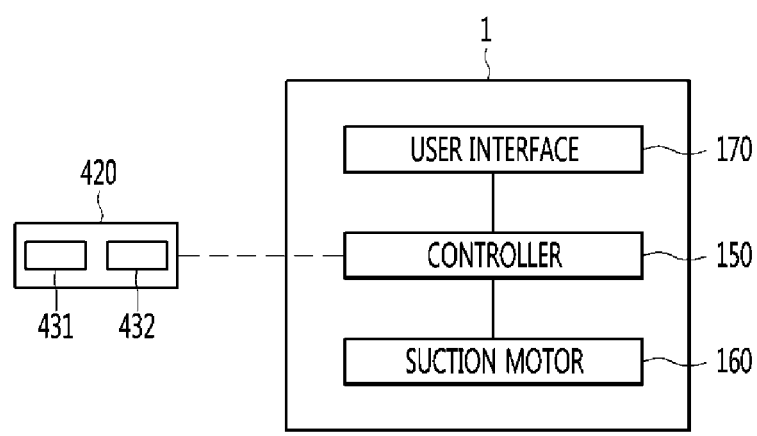
FIG. 15 is a block diagram showing the configuration of a vacuum cleaner according to a second embodiment.

Referring to FIGS. 14 and 15, the vacuum cleaner according to this embodiment may include a cleaner body 300 including a mounting part 302 and a battery assembly 420 which is detachably mounted on the mounting part 302. The cleaner body 300 may include a cover member (not shown) for covering the battery assembly 420 in a state in which the battery assembly 420 is mounted on the mounting part 302. Although not limited thereto, the battery assembly 420 may be mounted on the mounting part 302 from the rear side of the cleaner body 10.

The battery assembly 420 may include a battery case 421 and a plurality of battery units 431 and 432 accommodated in the battery case 421. The plurality of battery units 431 and 432 may include a first battery unit 431 and a second battery unit 432, although not limited thereto. Each of the battery units 431 and 432 may include a plurality of battery cells. The plurality of battery cells may be chargeable/dischargeable secondary batteries, and the battery cells configuring each of the battery units 431 and 432 may be connected in series.

The first battery unit 431 and the second battery unit 432 may be independently replaced. That is, the battery units 431 and 432 may be independently separated from the battery case 421. According to this embodiment, since the battery assembly 420 is separated from the cleaner body, it is possible to easily replace the battery cell. In particular, since the battery assembly 420 includes the plurality of battery units 431 and 432, it is possible to individually replace the plurality of battery units 431 and 432.

The vacuum cleaner of this embodiment may further include a user interface 170 and a controller 150. Since the user interface 170 and the controller 150 are equal to the user interface and the controller 150 of the first embodiment, a description thereof will be omitted.

Figure 16:
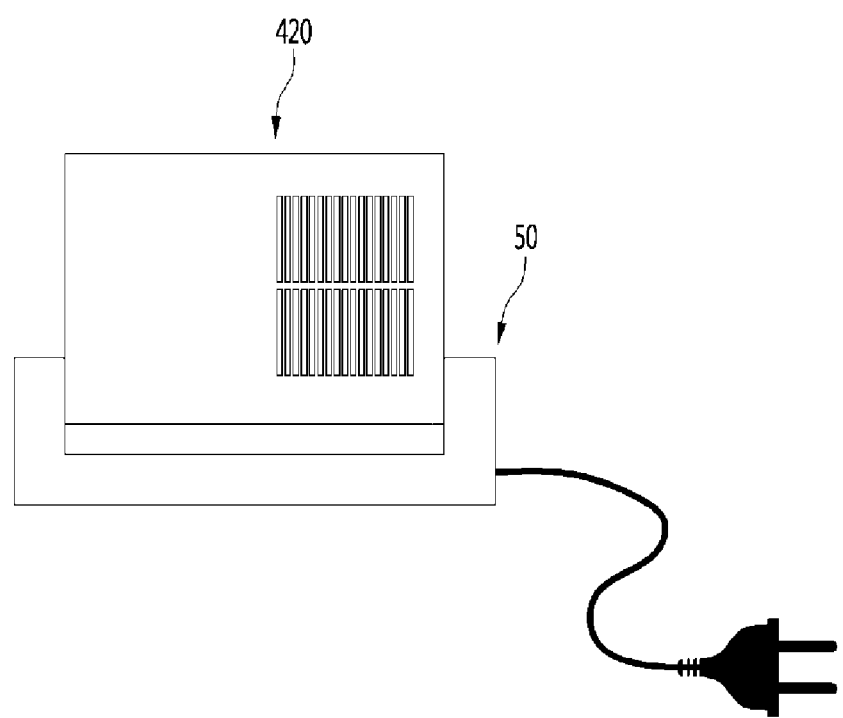
FIG. 16 is a diagram showing a state in which a battery assembly according to a second embodiment is separated from a cleaner body and is seated on a charging stand.

Referring to FIGS. 15 and 16, the battery assembly 420 separated from the cleaner body 300 may be seated on the charging stand 50. When the battery assembly 420 is seated on the charging stand 50, the battery assembly 420 may be charged.

While the battery assembly 420 is charged, the first battery unit 431 and the second battery unit 432 may be connected in parallel and, when the battery assembly 420 is mounted on the cleaner body 300, the first battery unit 431 and the second battery unit 432 may be connected in series. Hereinafter, the battery assembly will be described in detail.

Figure 17:
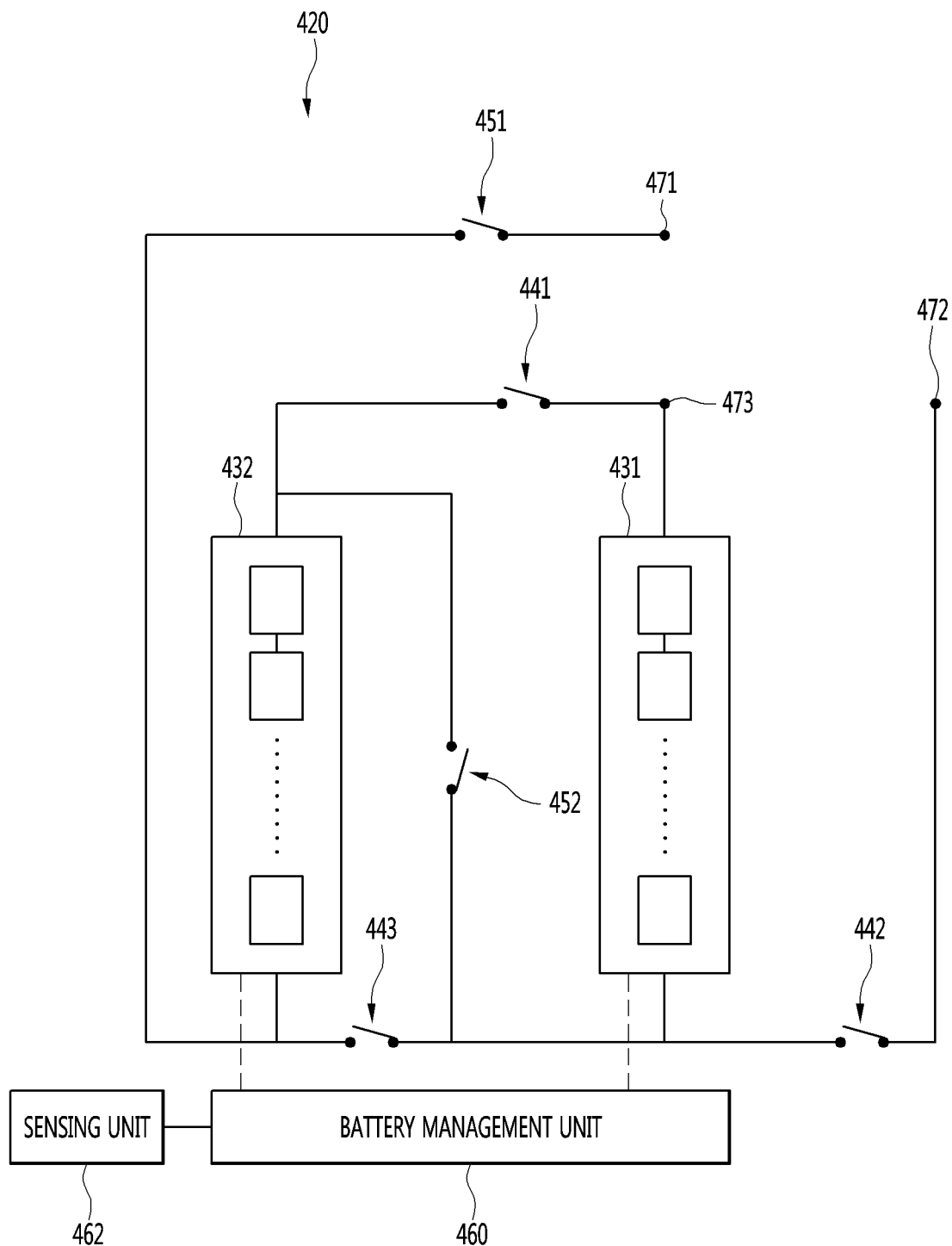
FIG. 17 is a diagram showing the configuration of a battery assembly according to a second embodiment.
Figure 18:
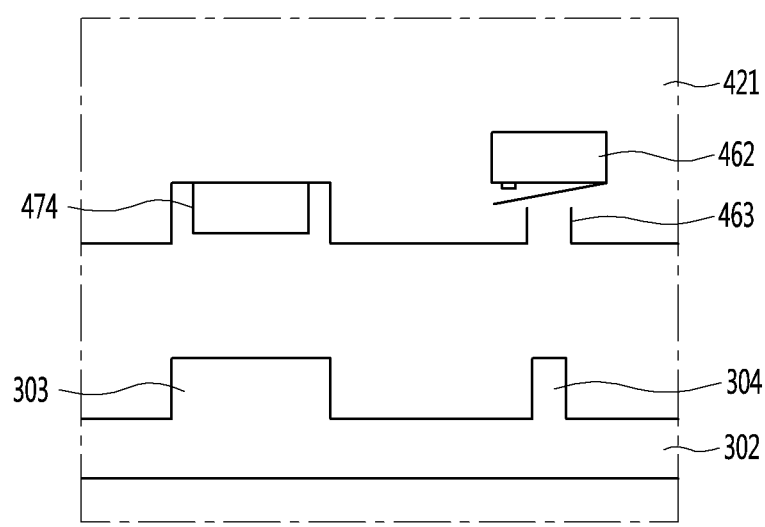
FIG. 18 is a diagram showing a connection part between a battery assembly and a cleaner body according to a second embodiment.

Referring to FIGS. 17 and 18, the battery assembly 420 of this embodiment may include the plurality of battery units 431 and 432, a switching mechanism for switching the connection state of the plurality of battery units 431 and 432, and a battery management unit 460 for managing charging and/or discharging of the plurality of battery units 431 and 432. The switching mechanism connects the first battery unit 431 and the second battery unit 432 in parallel upon charging the plurality of battery units 431 and 432 and connecting the first battery unit 431 and the second battery unit 432 in series when the battery assembly 420 is mounted on the cleaner body 300.

The switching mechanism may include charging switching mechanism 441, 442 and 443 and discharging switching mechanism 451 and 452. The charging switching mechanism 441, 442 and 443 may include the first charging switch 441, the second charging switch 442 and the third charging switch 443. The first charging switch 441 may connect or disconnect the negative terminal 473 and one of the plurality of battery units, that is, the second battery unit 432.

The second charging switch 442 may connect or disconnect one of the plurality of battery units, for example, the first battery unit 431, and the positive terminal 472 for charging. The third charging switch 443 may connect or disconnect the first battery unit 431 and the second battery unit 432. The charging switches 441, 442 and 443 may be connected to the battery management unit 460 to receive a control signal from the battery management unit 460, thereby performing switching operation.

The discharging switching mechanism 451 and 452 may include a first discharging switch 451 and a second discharging switch 452. The first discharging switch 451 may connect or disconnect one of the plurality of battery units, for example, the second battery 432, and the positive terminal 471 for discharging. The second discharging switch 452 may connect or disconnect the first battery unit 431 and the second battery unit 432. The discharging switches 451 and 452 may be connected to the battery management unit 460 to receive a control signal from the battery management unit 460, thereby performing switching operation.

The battery assembly 420 may include a sensing unit 462 to sense whether the battery assembly 420 is mounted on the cleaner body 300 and a battery terminal 474 for connection with the cleaner body 300. The mounting part 302 of the cleaner body 300 may include a body terminal 303 connected to the battery terminal 474 and a protrusion 304 for operating the sensing unit 462. At this time, the battery case 421 may include an accommodation part 463 for accommodating the protrusion 304. The sensing unit 462 may be located adjacent to the accommodation part 463.

The sensing unit 462 may be a micro switch which may be mechanically turned on or off by external force. The battery management unit 460 may recognize the on or off state of the sensing unit 460 and control the switching mechanism according to the on or off state of the sensing unit 462.

Figure 19:
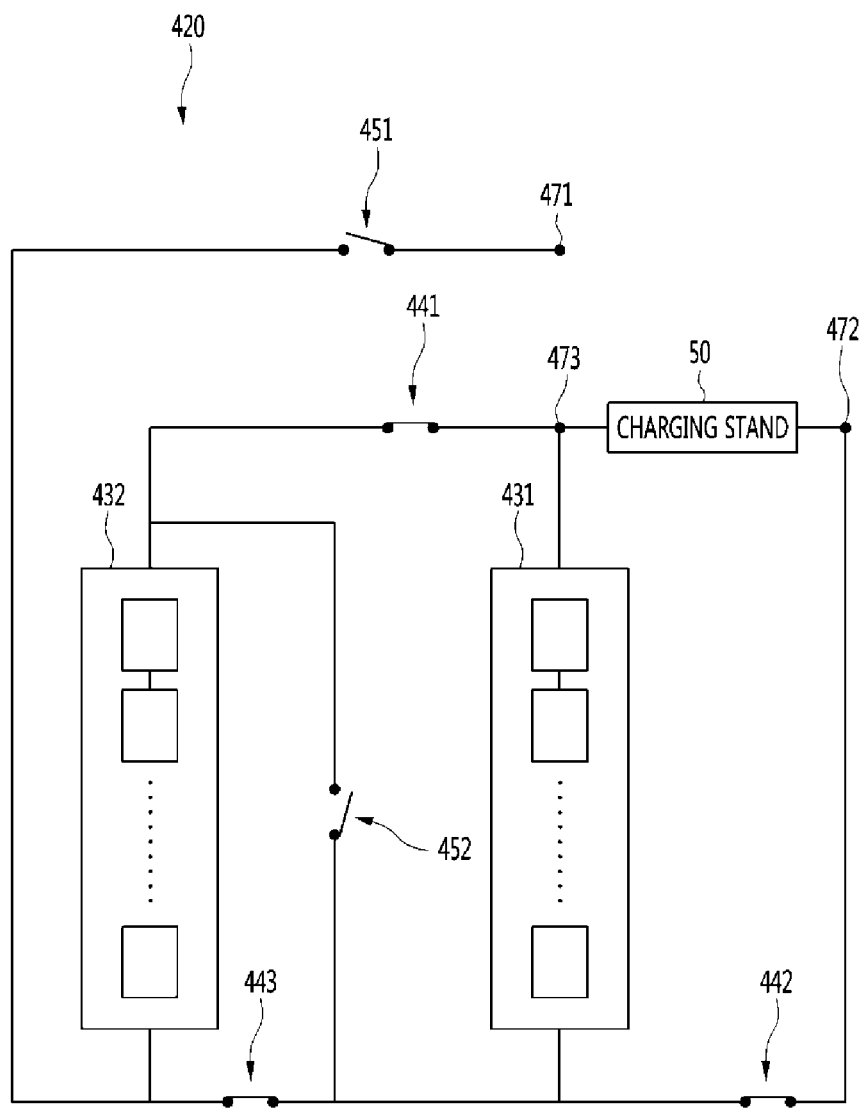
FIG. 19 is a diagram showing operation of a switching mechanism upon charging a battery assembly according to a second embodiment.

FIG. 19 is a diagram showing operation of a switching mechanism upon charging a battery assembly according to a second embodiment. Referring to FIG. 19, the battery assembly 420 may be separated from the cleaner body 300 and connected to the charging stand 50 and may be charged in a state of being connected to the charging stand 50.

Upon charging the battery assembly 420, the first to third charging switches 441, 442 and 443 are turned on and the first discharging switches 451 and 452 are turned off. Accordingly, the first battery unit 431 and the second battery unit 432 are connected in parallel. The voltage output from the charging stand 50 is supplied to the first battery unit 431 and the second battery unit 432 to charge the first battery unit 431 and the second battery unit 432. Although not limited thereto, the charging stand 50 outputs a voltage of 42.4 V or less and the maximum charging voltage of each of the battery units 431 and 432 may be 42.4 V or less.

Figure 20:
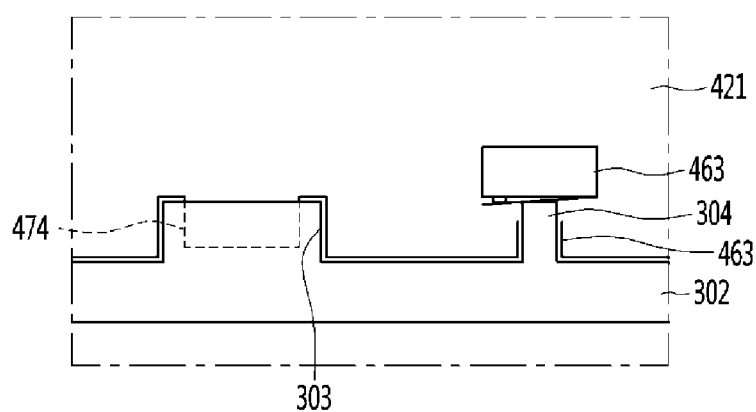
FIG. 20 is a diagram showing a state in which a battery assembly is mounted on a cleaner body.
Figure 21:
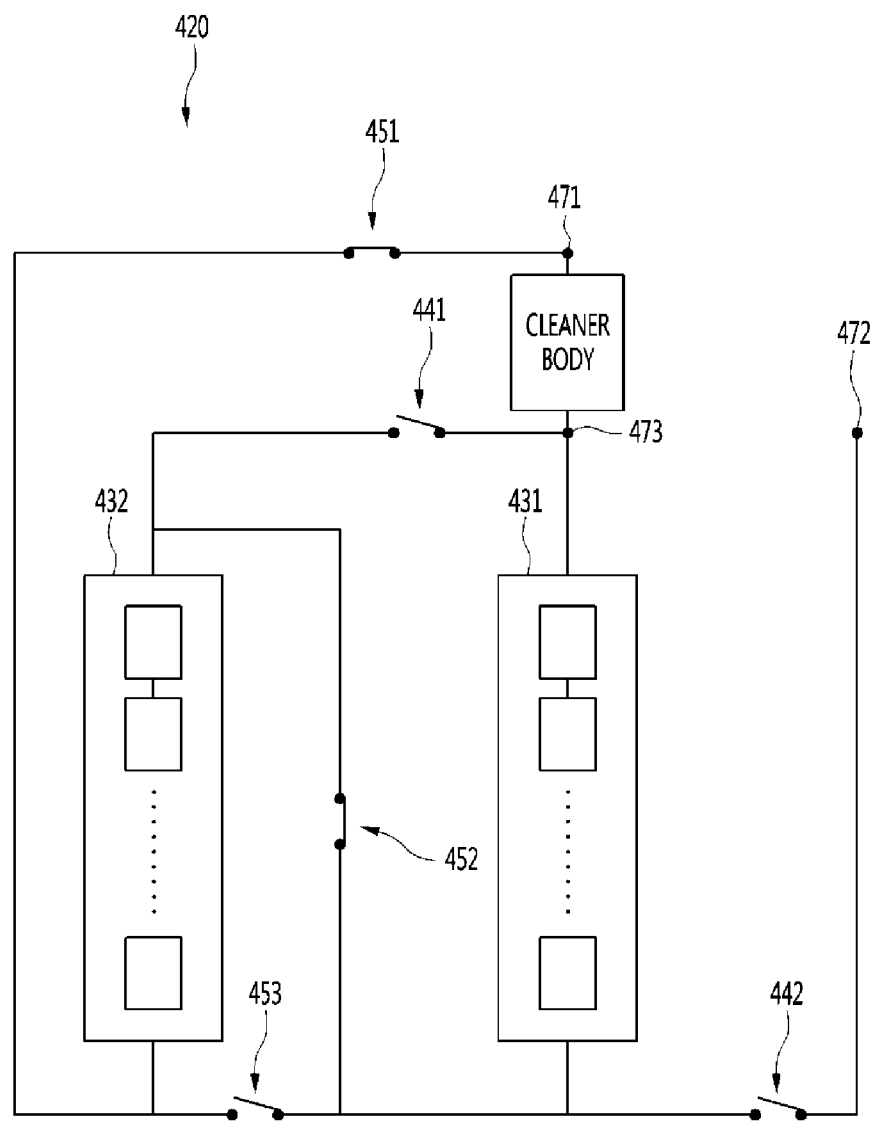
FIG. 21 is a diagram showing operation of a switching mechanism upon discharging a battery assembly according to a first embodiment.

Referring to FIGS. 20 and 21, in a state in which the battery assembly 420 and the charging stand 50 are disconnected, the sensing unit 462 is maintained in the off state. The battery management unit 460 may turn the discharging switches 451 and 452 off in a state in which the sensing unit 462 is turned off.

In addition, the battery management unit 460 may turn the charging switches 441, 442 and 443 on or off in a state in which the sensing unit 462 is turned off. That is, the battery management unit 460 may turn the switching mechanism off in a state in which the sensing unit 462 is turned off.

When the discharging switches 451 and 452 are in the off state, the voltage of the battery terminal 474 of the battery assembly 420 may be 42.4 V or less regardless of the on or off state of the charging switches 441, 442 and 443, such that a safety problem does not occur. When the battery assembly 420 is mounted on the mounting part 302 of the cleaner body 300, the battery terminal 474 is connected to the body terminal 303.

In addition, the protrusion 304 is accommodated in the accommodation part 463 such that the protrusion 304 operates the sensing unit 462 to turn the sensing unit 462 on. The battery management unit 460 turns the charging switches 441, 442 and 443 off and turn the discharging switches 451 and 452 on, when the sensing unit 462 is in the on state. Accordingly, the first battery unit 431 and the second battery unit 432 may be connected in series.

When an operation starting command of the suction motor 160 is received, a voltage obtained by adding the charging voltage of the first battery unit 431 and the charging voltage of the second battery unit 432 may be output to the suction motor 160. That is, the maximum output voltage of the battery assembly 420 may be 84.8 V or less.

According to this embodiment, since a high voltage of 84.8 V or less is supplied to the suction motor 160, the suction motor 160 may output high power. Thus, the suction force of the vacuum cleaner can increase to improve cleaning performance.

Although the two battery units 431 and 432 are connected in parallel or in series in the above embodiment, three or more battery units may be connected in parallel or in series. The battery unit may be individually replaced regardless of the number of battery units. According to this embodiment, since the discharging switch is turned on to connect the battery units in series only when the battery assembly is mounted on the cleaner body, stability can be ensured in a process of replacing the battery assembly, and an additional structure for insulation is unnecessary in the battery terminal of the battery assembly.

Although the sensing unit is a switch in the above embodiment, a magnet may be provided in the mounting part of the cleaner body and the sensing unit may be a magnetic sensor for sensing magnetism of the magnet. In this embodiment, the state of the sensing unit is changed according to the position of the battery assembly and the sensing unit may output a switching signal at the position where the battery assembly is mounted on the cleaner body. Then, the battery management unit may control the switching mechanism such that the plurality of battery units is connected in series.

In the present invention, the firs embodiment and the second embodiment may be combined. For example, the battery assembly 120 of the first embodiment may be detachably coupled to the mounting part of the cleaner body and the battery assembly 120 may include the switching mechanism described in the second embodiment.

In this case, when it is sensed that the battery assembly 120 is mounted on the cleaner body and the switch 210 of the first embodiment is turned on in the battery unit, the switching mechanism may connect the first battery unit 131 and the second battery unit 132 in series. When the battery assembly 120 is separated from the cleaner body, the switch 210 may be turned on. Accordingly, the switch 210 of the first embodiment serves as the sensing unit for sensing whether the battery assembly is mounted on the cleaner body of the second embodiment.

The present disclosure provides a vacuum cleaner capable of conveniently moving and generating high suction force. The present disclosure provides a vacuum cleaner capable of preventing charging and discharging in a state in which a battery assembly is separated from a cleaner body. The present disclosure provides a battery assembly and vacuum cleaner capable of performing charging in a state in which battery units are connected in parallel and performing discharging in a state in which the battery units are connected in series.

The present disclosure provides a vacuum cleaner having a detachable battery assembly mounted therein and capable of performing discharging at a high voltage in the battery assembly in a state in which the battery assembly is mounted on a cleaner body. A vacuum cleaner may comprise a cleaner body including a suction motor for generating suction force; a suction part communicating with the cleaner body and suctioning air and dust; and a battery assembly to supply a power to the suction motor, the battery assembly includes a battery unit, a battery terminal, a switch to connect or disconnect the battery unit and the battery terminal, and a battery case to accommodate the battery unit, the cleaner body includes a body supporting the battery assembly and a switching operation part for operating the switch when the battery assembly is mounted on the cleaner body, a plurality of cover guides protrudes from the battery case, the body includes a plurality of body guides, and, when the plurality of cover guides is supported by the plurality of body guides, the switching operation part operates the switch.

According to another aspect of the present invention, a vacuum cleaner comprises a cleaner body including a suction motor for generating suction force and a mounting part, a suction part communicating with the cleaner body and suctioning air and dust, and a battery assembly detachably mounted on the mounting part of the cleaner body, for supplying a power to the suction motor, the mounting part includes a body connector, the battery assembly includes a plurality of battery units, a sensing unit for sensing whether the battery assembly is mounted on or separated from the cleaner body, a switching mechanism for performing switching operation to connect the plurality of battery units in parallel or in series, a battery connector connected to the body connector when the battery assembly is mounted on the mounting part, and a battery management unit for controlling the switching mechanism to connect the plurality of battery units in series when the sensing unit senses that the battery assembly is mounted on the mounting part of the cleaner body.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A vacuum cleaner comprising:
    a cleaner body including a suction motor to generate a suction force;
    a cleaner head communicating with the cleaner body to receive the suction force and to suction air and dust based on the suction force; and
    a battery assembly to supply a power to the suction motor, wherein the battery assembly includes:
        a battery module,
        a battery terminal,
        a switch to selectively provide an electrical connection between the battery module and the battery terminal, and
        a battery case to accommodate the battery module,
    wherein the cleaner body is configured to receive the battery assembly,
    wherein the battery case includes one or more cover guides,
    wherein the cleaner body includes one or more body guides,
    wherein the one or more cover guides engage the one or more body guides to position the battery assembly, when received in the cleaner body, to cause the switch to provide the electrical connection between the battery module and the battery terminal, and
    wherein:
        the cleaner body includes a switching operation protrusion to operate the switch,
        when the battery assembly is received in the cleaner body, the switching operation protrusion contacts the switch and causes the switch to provide the electrical connection between the battery terminal and the battery module, and
        when the battery assembly is separated from the cleaner body, the switching operation protrusion does not contact the switch, and the switch electrically disconnects the battery terminal and the battery module.

2. The vacuum cleaner of claim 1, wherein, when the battery assembly is received in the cleaner body, the switch operation protrusion is inserted into the battery assembly to operate the switch.

3. The vacuum cleaner of claim 2, wherein the battery case includes an accommodation channel to receive the switch operation protrusion and to direct the switch operation protrusion toward the switch.

4. The vacuum cleaner of claim 1, wherein the switch is mounted on the battery case.

5. The vacuum cleaner of claim 1, further comprising a battery management module to manage a voltage of the battery module,
    wherein the switch is mounted on the battery management module.

6. The vacuum cleaner of claim 1, wherein the cleaner body further includes a body terminal that is electrically connected to the battery terminal when the battery assembly is received in the cleaner body.

7. The vacuum cleaner of claim 6, wherein connecting the body terminal to the battery terminal causes the switch to electrically connect the battery terminal and the battery module.

8. The vacuum cleaner according to claim 7, wherein a portion of the body terminal is inserted into the battery assembly when the battery assembly is received in the cleaner body, and the inserted portion of the body terminal contacts the switch and causes the switch to electrically connect the battery terminal and the battery module.

9. The vacuum cleaner of claim 7, wherein the battery case exposes a portion of the switch proximate to the battery terminal.

10. The vacuum cleaner of claim 1, wherein the battery assembly includes:
    a plurality of battery modules, each of the plurality of battery modules including one or more battery cells;
    a switching mechanism to selectively connect the plurality of battery modules in parallel or in series; and a battery management module to control the switching mechanism such that the switching mechanism connects the plurality of battery modules in series when the plurality of battery modules are discharging.

11. The vacuum cleaner of claim 10, wherein the battery assembly provides air gaps between the plurality of battery modules and the battery case.

12. The vacuum cleaner of claim 10, wherein the battery management module controls the switching mechanism to connect the plurality of battery modules in parallel when the battery assembly is removed from the cleaner body.

13. The vacuum cleaner of claim 10, wherein the switching mechanism includes:
 a first charging switch that, when activated, provides an electrical connection between a negative terminal and one or more of the plurality of battery modules;
 a second charging switch that, when activated, provides an electrical connection between at least one of the plurality of battery units and a positive terminal for charging; and
 a third charging switch that, when activated, provides an electrical connection between two or more of the plurality of battery units,
 each of the first, the second, and the third charging switches being activated when charging the battery assembly.

14. The vacuum cleaner of claim 10, wherein the switching mechanism includes:
 a first discharging switch that, when activated, provides an electrical connection between one of the plurality of battery modules and a positive terminal for discharging; and
 a second discharging switch that, when activated, provides an electrical connection between the plurality of battery modules,
 each of the first and the second discharging switches being activated when the battery assembly is discharging.

15. A vacuum cleaner comprising:
 a cleaner body including a suction motor to generate a suction force;
 a cleaner head communicating with the cleaner body to receive the suction force and to suction air and dust based on the suction force; and
 a battery assembly configured to be received by the cleaner body and to supply power to the suction motor, wherein the battery assembly includes:
  a plurality of battery modules;
  a sensor to sense whether the battery assembly is received by the cleaner body;
  a switching mechanism to electrically connect the plurality of battery modules in parallel or in series; and
  a battery management module to control the switching mechanism to electrically connect the plurality of battery units in series when the sensor senses that the battery assembly is received by the cleaner body.

16. The vacuum cleaner of claim 15, wherein the battery management module causes the switching mechanism to electrically connect the plurality of battery modules in parallel when the battery assembly is being charged.

17. The vacuum cleaner of claim 15, wherein, when the sensor senses that the battery assembly is separated from the cleaner body, the battery management module deactivates the switching mechanism.

18. The vacuum cleaner of claim 15, wherein:
 the sensor includes a micro switch, and
 the cleaner body includes a protrusion to contact the micro switch when the battery assembly is received by the cleaner body.

19. The vacuum cleaner of claim 15, wherein:
 the cleaner body includes a magnet, and
 the sensor detects the magnet when the battery assembly is received by the cleaner body.

20. A vacuum cleaner comprising:
 a cleaner body including a suction motor to generate a suction force and a cleaner terminal;
 a cleaner head communicating with the cleaner body to receive the suction force and to suction air and dust based on the suction force; and
 a battery assembly to supply a power to the suction motor, wherein the battery assembly includes:
  a battery case received in the cleaner body;
  a battery module received within the battery case;
  a battery terminal provided on the battery case and selectively connected to the cleaner terminal;
  a switch received in the battery case and configured to selectively provide an electrical connection between the battery module and the battery terminal,
 wherein when the battery case is received in the cleaner body, a portion of the cleaner body causes the switch to be turned on such that the switch provides the electrical connection between the battery terminal and the battery module, and
 when the battery case is separated from the cleaner body, the switch is turned off such that the switch electrically disconnects the battery terminal and the battery module.

* * * * *